Patented July 18, 1950

2,515,801

UNITED STATES PATENT OFFICE 2,515,801

PLASTICS MOLDING COMPOSITIONS

Edward M. Sadowski, Indianapolis, Ind., assignor to Radio Corporation of America, a corporation of Delaware No Drawing. Application August 6, 1946,
Serial No. 688,702

9 Claims. (Cl. 260—17)

This invention relates to compositions adapted to be moulded into shaped articles with the application of heat and pressure. Although adapted to be moulded into articles of almost any shape, which may serve a variety of useful or ornamental purposes, the compositions are especially useful for making sound records such as, for example, disc phonograph records. This invention is related to co-pending application of Edward M. Sadowski and Eugene D. O'Mahony, Serial No. 687,712, filed August 1, 1946.

It has been conventional in the record industry to press or mould disc phonograph records from compositions containing resinous materials and filler. Resinous material used has often been natural shellac. It is now desired, however, to use moulding compositions containing other plastic ingredients in place of either all or some of the shellac in order to make records and other moulded articles having improved properties.

One object of the present invention is to provide moulding compositions which can be substituted for compositions containing shellac as the principal resinous ingredient and which can be used to manufacture moulded articles having properties superior to those made of said shellac compositions.

Another object is to provide plastics moulding compositions which can be used to make articles having improved strength and rigidity as well as resistance to cold flow.

Another object is to provide moulding compositions using a fair proportion of the softer grades of thermoplastic materials having high fluidity when molten and also having relatively low softening temperatures, which may be used to make sound record discs of high quality.

Another object is to provide plastics moulding compositions which have excellent moulding properties with a high proportion of filler.

Another object is to provide moulding compositions suitable for making phonograph records having good wearing qualities equal at least to those of shellac records.

Still another object is to provide moulding compositions suitable for making phonograph records, which compositions contain a novel type of surface lubricant.

It has been found that the above objects may be achieved and excellent moulding compositions provided using formulas in which the shellac is either wholly or partially replaced by a mixture of resinous or so-called plastic materials. These resinous materials may be entirely of a synthetic nature but it is also possible to use as part of the compositions some natural resins including a certain proportion of shellac.

The essential ingredients of the compositions made according to the present invention are ethyl cellulose, preferably with an ethoxyl content of 40–50 percent, and a polyvinyl acetate synthetic resin. These materials are tough and, moreover, have the very desirable property of being miscible with many other thermoplastic resinous materials which are less expensive. They are preferably used with a fairly high proportion of filler although the amount of this latter ingredient may vary over a wide range.

Other desirable properties are added to the present compositions by using, in addition to the two plastic ingredients mentioned above, varying amounts of a third type of resinous material. This latter material is added principally to enhance the moulding properties of the compositions but improved physical properties of the moulded product are also introduced by its use. This third resinous ingredient may be any one or more of a rather large group of thermoplastic resinous materials which vary widely as to their chemical nature. All of them, however, have the property of being highly fluid when molten and they have relatively low softening points. Their softening points as measured by the well known ball and ring method may range from about 75° C. to about 170° C. This group of resins includes both natural and synthetic materials and also encompasses within its scope some resinous substances commonly described as asphalts and pitches. A few of the synthetic resins which fall within this category are a polymerized resin which is the gasoline insoluble, aromatic hydrocarbon soluble resinous extract of pinewood, coumarone-indene resins, and many phenolic resins in the A or B stages such as the incompletely condensed phenol formaldehyde resins. Some of the natural resinous materials found suitable are rosin, rosin esters, hydrogenated rosin and resins which are distillation products of sugar cane. Pitches derived from wood tar or coal tar may also be used as well as various asphalts such as gilsonite. It is only essential that these materials have softening points within the range specified above and that they be highly fluid when molten. Shellac, itself, may be used in this part of the composition although a resin such as the above described resinous extract of pinewood is preferred.

Since the compositons are to be used in making moulded articles, it is desirable to incorporate a suitable mould lubricant to prevent sticking to the mould surfaces. For this purpose, a metal stearate such as zinc stearate is preferred although other metal soaps of the long chain fatty acids such as palmitates or oleates may be substituted. Alternatively, the fatty acid, itself, may be used instead of the metal soap.

In order to adapt the compositions to various moulding purposes, other ingredients may be added such as fillers or extenders, waxes, dyes, pigments, etc. To adapt the compositions specifically for the making of phonograph record discs, anti-friction materials such as waxes have been found desirable. These may be natural waxes, such as carnauba, montan, or ceranova or synthetic waxes such as a microcrystalline hydrocarbon wax and a modified fatty acid ester. The chemical composition of the wax is not particularly important. Almost any of the harder waxes may be used providing it is compatible with the resinous ingredients.

It has also been found that in lieu of one of these waxes a material such as polyethylene may be used. The function of the anti-friction compound in a record composition is to provide a thin film of surface lubricant which lowers friction between the playing surface and the phonograph needle, thereby improving wear. Although polyethylene is regarded as an elastomer, it has been found that it provides a degree of lubrication equal to or better than most waxes. As a pigment, carbon black may be used although this may be changed if a color other than black is desired in the finished product. Oil soluble dyes and pigments, for example, will do equally well. The proportion and kind of filler which may be used in the compositions varies widely depending mainly upon the use to which the moulded product is to be put and also, to a degree, on the resinous part of the composition. In general, the amount of filler may vary from 45 to 80 percent by weight of the total composition. In compositions to be used for making phonograph records, the preferred amount of filler is 60–75 percent. For general purpose moulding powders this range may be widened to from 50 to 80 percent. These ranges hold for the compositions containing all three types of resinous ingredients. If the third type, that is, the low melting highly fluid resin type, is omitted, the percentage of filler is preferably lower and may be around 45 percent.

Many different kinds of fillers may be used. For making phonograph records, it is preferred to use finely powdered mineral products such as limestone or slate flours, powdered silica, diatomaceous earth or clays. Not as desirable but still permissible is the addition of smaller percentages of fibrous fillers such as cellulosic flocks, including cotton flocks or mineral fibers such as those made of asbestos, mineral wool, or glass. For general purpose moulding powders higher percentages of the fibrous fillers may be used and wood flour may be used in place of the mineral fillers.

An example of a typical formulation especially suitable for moulding disc phonograph records is as follows:

*Example 1*

| | Percent |
|---|---|
| Ethyl cellulose | 5.0 |
| Polyvinyl acetate | 3.0 |
| The gasoline insoluble, aromatic hydrocarbon soluble resinous extract of pinewood | 17.5 |
| Zinc stearate | 0.5 |
| Carbon black | 2.5 |
| Carnauba wax | 1.5 |
| Fillers | 70.0 |

Another preferred formulation suitable for making phonograph records which includes the use of a plasticizer is as follows:

*Example 2*

| | Percent |
|---|---|
| Ethyl cellulose | 5.0 |
| Polyvinyl acetate | 3.0 |
| The gasoline insoluble, aromatic hydrocarbon soluble resinous extract of pinewood | 17.5 |
| Zinc stearate | 0.5 |
| Carbon black | 2.5 |
| Carnauba wax | 1.5 |
| Fillers | 69.0 |
| Orthonitrodiphenyl | 1.0 |

If it is desired to omit the third type of resinous ingredient entirely; i. e., that typified by the gasoline insoluble, aromatic hydrocarbon soluble resinous extract of pinewood in the above formulas, a composition such as the following may be used to make records:

*Example 3*

| | Percent |
|---|---|
| Ethyl cellulose | 27.5 |
| Polyvinyl acetate | 17.0 |
| Zinc stearate | 0.5 |
| Carbon black | 2.5 |
| Carnauba wax | 1.5 |
| Fillers | 45.0 |
| Orthonitrodiphenyl | 6.0 |

To make commercially usable moulding powders out of the above and similar formulations, the ingredients are powdered and dry-mixed and after suitable pre-blending are charged into a Banbury mixer. Mixing time in the Banbury is from 2½ to 4½ minutes after fusion starts. The mixed materials are then dumped onto sheeter rolls and formed into sheets which can be ground up to form a moulding powder or cut into blocks for moulding from a so-called "biscuit."

When used for moulding records, the "biscuit" may be pre-heated on a steam table at 140 pounds steam pressure. The heated "biscuit" is then placed in the stamping press and moulded under 1800–2000 pounds per square inch pressure for from about 28 to about 35 seconds. The temperature during the forepart of this stamping operation is about 230°–260° F. The moulded product is rapidly cooled while still under pressure and is removed while at a temperature of 90°–100° F. When the third type of resin such as the gasoline insoluble, aromatic hydrocarbon soluble resinous extract of pinewood is not used, the moulding temperature must be higher and the pressing cycle is longer.

In these compositions, it is possible to use a considerable range of each of the plastic ingredients. The amount of ethyl cellulose may be varied from about 3 to about 10 percent. The polyvinyl acetate may be used in proportions ranging from about 1 to about 10 percent and the softer thermoplastic resin; i. e., the gasoline insoluble, aromatic hydrocarbon soluble resinous extract of pinewood, in examples 1 and 2, may be varied from about 15 to about 24 percent although it is possible to use amounts of this type of resin in any amount up to 24 percent. These percentages are all by weight and are for compositions in which a filler constitutes the major proportion of the composition. As the percentage of filler becomes lower, the percentages of the plastics with respect to the total composition will, of course, be much higher although the ratio of the three plastic ingredients will remain about the same with respect to each other. As stated previously, it is possible to make more or less satisfactory moulding compositions out of mixtures omitting the more fluid type thermoplastic resinous material entirely although this is not preferred since use of the latter resin improves the mounding properties greatly and permits the use of higher proportions of filler.

The amounts of the other lesser important ingredients of the present compositions may also be varied to a considerable extent. The surface lubricant comprising either wax or polyethylene may range from 0 to about 3 percent, the preferred amount being about 1.5 percent. The plasticizer may vary from about 0.5 to 3 percent in those compositions using all three types of resinous ingredients, and, besides being orthonitrodiphenyl, may be orthoaminodiphenyl, dibutyl phthalate, dioctyl phthalate, drying oils or many other compounds which have been well known as plasticizers for the types of resins involved. In those compositions omitting the third type of resinous ingredient, the amount of plasticizer must be considerably higher to retain adequate moulding properties. In general, the amount of plasticizer should be approximately one-seventh of the total amount of the tougher resinous ingredients; i. e., the ethyl cellulose plus the polyvinyl acetate. The carbon black content usually ranges from 0 to about 3 percent, the preferred amount being 2.5 percent, especially in record compositions. The fatty acid or fatty acid metallic soap used as a mould lubricant may vary from 0 to about 2 percent, the preferred amount being about 0.5 percent.

Although specific ranges of ingredients have been fully described above, it is not desired to be limited to these. Larger amounts of the minor ingredients may be added, for example, although there is no particular advantage in doing so since the product will not be improved and may even be less satisfactory.

Compared to moulding compositions containing shellac as the principal resinous ingredient, the compositions of the present invention produce moulded products having an increase of 20 percent or more in flexural strength, higher bursting strength and they have wear qualities equal to or better than essentially shellac compositions.

These new compositions have also been found to be superior in certain respects to those using only ethyl cellulose and a softer thermoplastic resin without polyvinyl acetate. Without the polyvinyl acetate, records made of these compositions possess good strength but lack the proper flow qualities unless the soft resin content is increased to the point where the wearing qualities become very poor. Omitting ethyl cellulose and using only the polyvinyl acetate for the softer thermoplastics has also been tried but the resulting products exhibit cold flow and therefore have too great a tendency to warp.

There have thus been described improved moulding compositions comprising ethyl cellulose, a polyvinyl acetate and preferably but not necessarily one of the cheaper and softer grades of thermoplastic resinous materials. These compositions preferably contain at least a moulding lubricant and may in addition contain other modifiers such as dyes or pigments, surface lubricants, fillers and plasticizers. These compositions may be used to mould any desired article but are especially valuable in making discs in the surface of which a spiral sound track is simultaneously impressed. The compositions may be made up in finely powdered form and mouldings may be made directly from this powder. Or, the powder may be pre-moulded in the form of blocks or "biscuit" of standard shape and this "biscuit" then placed into the final mould to be formed into the ultimate shape with the application of heat and pressure.

I claim as my invention:

1. A moulding composition suitable for making phonograph records comprising 3-10 percent ethyl cellulose, 1-10 percent polyvinyl acetate, 15-24 percent of a thermoplastic resinous material having a softening point of between 75° and 170° C. which is highly fluid when molten, 0.5-3 percent of a plasticizer for said ethyl cellulose and said polyvinyl acetate, and 60-75 percent of a filler.

2. A composition according to claim 1 in which said thermoplastic resinous material is the gasoline insoluble, aromatic hydrocarbon soluble resinous extract of pinewood.

3. A composition according to claim 2 including up to 2 percent of a mould lubricant from the class consisting of long chain fatty acids and long chain fatty acid metallic soaps.

4. A composition according to claim 3 including up to 3 percent of a wax.

5. A phonograph disc record made up of a composition comprising 3-10 percent ethyl cellulose, 1-10 percent polyvinyl acetate, 15-24 percent of a thermoplastic resinous material having a softening point between 75° and 170° C. which is highly fluid when molten, 0.5-3 percent of a plasticizer for said ethyl cellulose and said polyvinyl acetate, and 60-75 percent of a filler.

6. A phonograph record according to claim 5 in which said thermoplastic resinous material is the gasoline insoluble, aromatic hydrocarbon soluble resinous extract of pinewood.

7. A phonograph record according to claim 6 including up to 3 percent of a wax.

8. A phonograph record according to claim 7 including up to 2 percent of a mould lubricant from the class consisting of long chain fatty acids and long chain fatty acid metallic soaps.

9. A phonograph record according to claim 8 including up to 3 percent carbon black.

EDWARD M. SADOWSKI.

REFERENCES CITED

The following references are of record in the file of this patent:

UNITED STATES PATENTS

| Number | Name | Date |
| --- | --- | --- |
| 2,114,393 | Lane | Apr. 19, 1938 |
| 2,313,186 | Wiggam | Mar. 9, 1943 |
| 2,327,862 | Borglin | Aug. 24, 1943 |
| 2,388,613 | Keller | Nov. 6, 1945 |
| 2,446,121 | Adelson et al. | July 27, 1948 |
| 2,446,578 | Eddison | Aug. 10, 1948 |

FOREIGN PATENTS

| Number | Country | Date |
| --- | --- | --- |
| 308,658 | Great Britain | Sept. 25, 1930 |
| 345,521 | Great Britain | Mar. 26, 1931 |
| 404,279 | Great Britain | Jan. 5, 1934 |

OTHER REFERENCES

C. S. Myers Plastics (Chicago), September 1944, pages 39, 40, 43, 42, and 100.